Patented July 2, 1946

2,403,013

UNITED STATES PATENT OFFICE 2,403,013

ALKYLATION

Jacob R. Meadow, Memphis, Tenn., assignor to Socony-Vacuum Oil Company, Incorporated, a corporation of New York No Drawing. Application November 11, 1944, Serial No. 563,093

20 Claims. (Cl. 260—671)

This invention relates generally to the alkylation of aromatic compounds, and is more particularly concerned with the production of valuable products by the catalytic alkylation of aromatic compounds with novel alkylating agents in the presence of Friedel-Crafts type alkylation catalysts.

Alkylation reactions are well known in the art and connote the union between an alkyl radical and an organic compound, usually a hydrocarbon, under conditions of temperature, pressure and time ordinarily referred to in the art as alkylating conditions. Generally speaking, the temperature and to a certain extent, the pressure and time of reaction employed in alkylation operations depend upon whether the alkylation is effected in the absence or presence of alkylation catalysts. The two methods are generally referred to as thermal and catalytic alkylation, respectively. Several substances and mixtures of substances have been proposed as alkylation catalysts. Sulfuric acid, phosphoric acid, hydrofluoric acid, metal phosphates, activated clays and the like, and metal and non-metal halides, especially those known in the art as Friedel-Crafts catalysts, such as aluminum chloride and boron trifluoride, have found wide application as alkylation catalysts. As is well known to those familiar with the art, the metal halide catalysts have been employed in conjunction with small amounts of other substances called promoters, ordinarily the corresponding hydrogen halides, which increase the catalytic activity and/or the useful life of these alkylation catalysts.

In alkylation reactions, the alkyl radical is supplied by a variety of substances accordingly known in the art as alkylating agents. Olefinic hydrocarbons, alkyl halides, alcohols, aralkyl halides, and less frequently, organic and inorganic esters, ethers, alkyl sulfates and alkene oxides have been proposed as alkylating agents.

Recently, Lee and Dougherty [Jl. Org. Chem. 4, 48] have reported the alkylation of benzene with benzyl mercaptan in the presence of at least one molecular weight of aluminum chloride as catalyst. However, they were unsuccessful in all attempts to alkylate benzene with primary aliphatic mercaptans and more specifically, with ethyl mercaptan and n-amyl mercaptan. In explaining the reaction between benzene and benzyl mercaptan, a primary aralkyl mercaptan, Lee and Dougherty postulated that mercaptans may be used as alkylating agents provided that they contain a thiomethylene group, i. e.,

the alkyl radical being furnished by cleavage of the carbon-sulfur linkage. Accordingly, in benzyl mercaptan:

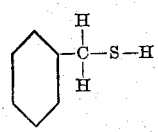

since the phenyl group is more negative than a methyl group, when both are compared with hydrogen, it is possible to achieve cleavage of the carbon-sulfur linkage in the presence of aluminum chloride. As examples of compounds suitable as alkylating agents, Lee and Dougherty mentioned benzyl mercaptan, benzyl sulfide and s-trithiane.

I have discovered that in the presence of Friedel-Crafts type alkylation catalysts tertiary aliphatic mercaptans are suitable alkylating agents for alkylating aromatic compounds.

It must be noted that tertiary aliphatic mercaptans do not possess the characteristics of the alkylating agents used and postulated to be essential by Lee and Dougherty. Further, these authors pointed out the necessity of using amounts of aluminum chloride at least equal, in terms of molecular weights, to those of their alkylating agents, their theory being that aluminum chloride enters into combination with the sulfur of their alkylating agents to form a double bond between the sulfur and aluminum atoms:

I have found on the other hand, that tertiary aliphatic mercaptans, for example, tertiary butyl mercaptan, will readily alkylate benzene when the reaction is carried out in the presence of as little as 0.0075 molecular weight of aluminum chloride per molecular weight of tertiary butyl mercaptan.

Accordingly, it is an object of the present invention to provide an efficient process for alkylating aromatic compounds. Another object is to provide an efficient process for catalytically alkylating aromatic compounds. A very important object is to provide a process for alkylating aromatic compounds with tertiary aliphatic mercaptans. A more specific object is to afford a process for alkylating aromatic compounds with tertiary aliphatic mercaptans in the presence of Friedel-Crafts type alkylation catalysts. Other objects and advantages of the present invention will become apparent to those skilled in the art from the following description.

Broadly stated, the present invention comprises a process for alkylating aromatic compounds, which includes contacting an aromatic compound with a tertiary aliphatic mercaptan in the presence of small amounts of a Friedel-Crafts type alkylation catalyst, in a reaction zone under alkylating conditions.

Using tertiary butyl mercaptan as a typical example of the novel alkylating agents of the present invention, the reaction desired can be represented by the following equation:

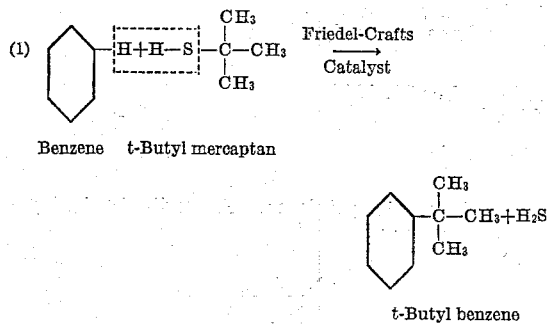

Benzene   t-Butyl mercaptan t-Butyl benzene

Under suitable reaction conditions, a second molecule of tertiary butyl mercaptan may react with the tertiary butyl benzene to yield ditertiary butyl benzene:

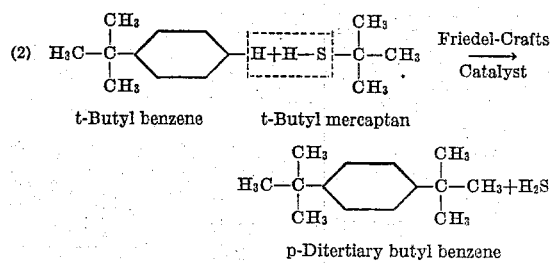

t-Butyl benzene   t-Butyl mercaptan p-Ditertiary butyl benzene

The tertiary aliphatic mercaptans to be used as alkylating agents in accordance with the process of the present invention may be derived from any suitable source, as is well understood in the art. In this connection, it should be noted that my process is of considerable commercial importance in that it furnishes a field of utilization for the mercaptans recovered in various processes for the desulfurization of gasoline and natural gas, sweetening processes and solutizer operations. Under the conditions of my process, primary and secondary aliphatic mercaptans do not function as alkylating agents. For example, attempts to alkylate benzene with n-butyl mercaptan and with isopropyl mercaptan under reaction conditions otherwise similar to those used for tertiary butyl mercaptan, produced no alkylation and only a trace of alkyl benzene, respectively. Generally speaking, any tertiary aliphatic mercaptan may be used as the alkylating agent. Tertiary butyl mercaptan, tertiary amyl mercaptan and tertiary hexyl mercaptan may be mentioned by way of non-limiting examples.

In accordance with the process of the present invention, any organic aromatic compound ordinarily amenable to alkylation may be used as the aromatic compound reactant. These organic aromatic compounds comprise aromatic hydrocarbons including alkyl derivatives of aromatic hydrocarbons, aromatic halogen compounds, aromatic aldehydes, aromatic ethers, aromatic alcohols, aromatic acids and derivatives thereof, aromatic ketones and aromatic nitrogen compounds.

As stated hereinbefore, the reaction of the process of my invention is carried out in the presence of Friedel-Crafts type alkylation catalysts. I have found anhydrous aluminum chloride and boron trifluoride particularly well suited for my process. These catalysts as well as complexes containing the same, such as the boron trifluoride-phenol complex, with or without suitable promoters, for example, hydrogen chloride in the case of aluminum chloride, are to be considered therefore, the preferred catalysts.

The amounts of catalysts to be used may vary within wide limits. However, I have found that for efficient operation, the amounts used should be appreciably less in terms of molecular weights, than the amounts of tertiary aliphatic mercaptan employed. For example, and as illustrated by the data tabulated below, in the alkylation of benzene with tertiary butyl mercaptan, the best yields of monotertiary butyl benzene were obtained when 0.064 molecular weight of aluminum chloride per one molecular weight of tertiary butyl mercaptan were employed.

| Amount of dry benzene in c. c. | Tertiary butyl mercaptan, gram molecular weight | Aluminum chloride | | Promoter | Percent yield of monotertiary butyl benzene based on t-butyl mercaptan |
|---|---|---|---|---|---|
| | | Gram molecular weight | Grams | | |
| 400 | 1 | 0.37 | 49 | HCl | 48 |
| 400 | 1 | 0.19 | 26 | HCl | 62 |
| 400 | 1 | 0.15 | 20 | HCl | 76 |
| 400 | 1 | 0.064 | 8.6 | HCl | 88 |
| 400 | 1 | 0.015 | 2.0 | None | 34 |
| 400 | 1 | 0.0075 | 1.0 | None | 9 |

In my process, it is desirable to keep the concentration of the alkylating agent relatively low during the alkylation reaction in order to eliminate as much secondary reactions as possible. Accordingly, it is advisable to maintain the concentration of the alkylating agent in the charge below about 25% by volume, and preferably between about 10% and about 20% by volume. In batch operation this may be effected by adding the tertiary aliphatic mercaptan slowly to the aromatic compound-catalyst mixture; while in continuous operation, this may be effected by introducing the tertiary aliphatic mercaptan at a number of points in the reaction zone, or by adding the alkylating agent to a recirculating mass of excess aromatic hydrocarbon reactant, reaction product and catalyst.

The process may be carried out as a batch, continuous or semi-continuous type of operation. Particularly when the process is carried out on a commercial scale, economic considerations make it preferable to operate in a continuous manner. For efficient operation, whether the process is carried out on a batch or continuous basis, it is essential that the reactants be intimately contacted with the catalyst. This may be effected in several ways, as is well known in the art.

Generally speaking, the alkylation conditions of my process are those commonly employed in alkylation processes involving the use of Friedel-Crafts type alkylation catalysts. I ordinarily use temperatures varying between about 0° C. and about 80° C. and pressures varying between atmospheric pressure and about 100 pounds per square inch. The time of reaction depends upon the temperature and to a certain extent upon the pressure. Ordinarily a reaction time varying between about 10 minutes and about 2 hours is satisfactory.

The following detailed examples are for the purpose of illustrating modes of carrying out the process of my invention, it being clearly understood that the invention is not to be considered as limited to the specific manipulations and conditions set forth in the examples. As it will be apparent to those skilled in the art, other Friedel-Crafts type alkylation catalysts and a wide variety of other aromatic compounds and of other tertiary aliphatic mercaptans within the scope of my invention, may be used as the alkylation reactants.

ALKYLATION OF BENZENE WITH TERTIARY BUTYL MERCAPTAN

The reaction between benzene and tertiary butyl mercaptan takes place readily in the presence of small amounts of aluminum chloride as catalyst. The yields of monotertiary butyl benzene are good and there are few complicating secondary reactions.

When monoalkyl benzene is the desired product, the alkylating agent should be added slowly (dropwise) to a large excess of benzene containing small amounts of catalyst, on the order of three to four gram molecular weights of benzene per gram molecular weight of alkylating agent. In this manner, the formation of di- and tri-alkyl benzenes is largely avoided.

Example 1

800 c. c. of dry benzene were placed in a three-neck, round-bottom, 2-liter flask, fitted with a stirrer, dropping funnel and reflux condenser, and were saturated with hydrochloric acid (promoter for aluminum chloride) by bubbling the latter through the former at room temperature (25° C.). 18 grams of anhydrous aluminum chloride were then added to the flask. 190 grams of tertiary butyl mercaptan (the equivalent of 0.064 gram molecular weight of aluminum chloride per gram molecular weight of tertiary butyl mercaptan) were added slowly to the mixture while stirring over a period of time of one hour. After the addition of the alkylating agent was completed, the mixture was gradually heated up to a temperature of 50° C. in a period of time of one hour. Hydrogen sulfide was copiously evolved during the heating. Stirring was continued for another half hour while the mixture was maintained at the reflux temperature (80° C.). The contents of the flask were then poured into an ice-dilute hydrochloric acid mixture, washed, dried over calcium chloride, and finally distilled through a 20-inch Vigreux column. After topping to remove benzene, 249 grams of substantially pure monotertiary butyl benzene, B. P. 165–168° C. (uncorrected), and only 22 grams of residue boiling above 168° C. were recovered. This represents an actual yield of 88% of tertiary butyl benzene based on the t-butyl mercaptan.

ALKYLATION OF MONOBUTYL BENZENE WITH TERTIARY BUTYL MERCAPTAN

Paraditertiary butyl benzene can be readily prepared by treating a slight excess of monobutyl benzene with tertiary butyl mercaptan in the presence of small amounts of aluminum chloride, on the order of about two gram molecular weights of monobutyl benzene per gram molecular weight of tertiary butyl mercaptan.

Example 2

294 grams or 2.2 gram molecular weights of monobutyl benzene were placed in a three-neck, round-bottom, 2-liter flask fitted with a stirrer, dropping funnel and reflux condenser. 5 grams of aluminum chloride were added to the flask. The mixture was then heated to a temperature of 40–50° C. and 90 grams or one gram molecular weight of tertiary butyl mercaptan were then added slowly to the mixture while stirring over a period of time of one hour. The temperature was then raised to 80–90° C. and stirred for another hour. The product was treated as in Example 1. A distillation of the crude product yielded 182 grams of material boiling up to 178° C. which proved to be largely unreacted monobutyl benzene, and 140 grams of crude paraditertiary butyl benzene which solidified on cooling. This represents an actual yield of 73.5% based on the t-butyl mercaptan. Recrystallization of the crude product from alcohol gave a white, crystalline solid melting at 73–75° C.

ALKYLATION OF PHENOL WITH TERTIARY BUTYL MERCAPTAN

In view of the fact that boron trifluoride gas forms complex compounds with ethers, alcohols, phenols, etc., it was decided to use the boron trifluoride-phenol complex as the catalyst since the complex would be formed in any case. The reaction yields para-tertiary butyl phenol:

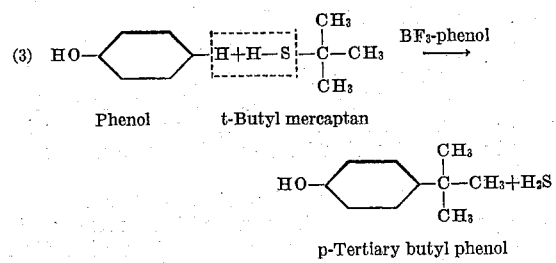

Example 3

463 grams of phenol were placed in a three-neck, round-bottom, 2-liter flask fitted with a stirrer, dropping funnel and reflux condenser 50 grams of boron trifluoride-phenol complex were added to the flask. The mixture was then heated to a temperature of 60° C. and 107 grams of tertiary butyl mercaptan were added dropwise to the mixture while stirring over a period of one hour. The stirring was continued for one hour. The crude product was washed with water, 10% aqueous solution of sodium hydroxide, and finally water again. After salting out with calcium chloride solution, a product weighing 434 grams was obtained. This product was placed in a distilling flask and distilled in vacuo with the following results:

| | Grams |
|---|---|
| Fraction up to 80° C. at 1 mm. pressure | 14 |
| Fraction 80–110° C. at 1 mm. pressure | 271 |
| Fraction 110–120° C. at 1 mm. pressure | 70 |
| Dry ice trap | 70 |
| Loss | 9 |

The 110–120° C. fraction was substantially pure tertiary butyl alcohol.

Although the present invention has been described in conjunction with preferred embodiments, it is to be understood that modifications and variations may be resorted to without departing from the spirit and scope of the invention, as those skilled in the art will readily understand. Such variations and modifications are considered to be within the purview and scope of the appended claims.

I claim:

1. The process for alkylating aromatic compounds, which comprises contacting an aromatic compound with a tertiary aliphatic mercaptan in the presence of an alkylation catalyst of the Friedel-Crafts type, in a reaction zone under alkylating conditions.

2. The process for alkylating aromatic compounds, which comprises contacting an aromatic compound with a tertiary aliphatic mercaptan in the presence of an alkylation catalyst comprising aluminum chloride in a reaction zone under alkylating conditions.

3. The process for alkylating aromatic compounds, which comprises contacting an aromatic compound with a tertiary aliphatic mercaptan in the presence of an alkylation catalyst comprising boron trifluoride in a reaction zone under alkylating conditions.

4. The process for alkylating aromatic hydrocarbons, which comprises contacting an aromatic hydrocarbon with a tertiary aliphatic mercaptan in the presence of an alkylation catalyst of the Friedel-Crafts type, in a reaction zone under alkylating conditions.

5. The process for alkylating aromatic hydrocarbons, which comprises contacting an aromatic hydrocarbon with a tertiary aliphatic mercaptan in the pressure of an alkylation catalyst comprising aluminum chloride in a reaction zone under alkylating conditions.

6. The process for alkylating aromatic hydrocarbons, which comprises contacting an aromatic hydrocarbon with a tertiary aliphatic mercaptan in the presence of an alkylation catalyst comprising boron trifluoride in a reaction zone under alkylating conditions.

7. The process for alkylating benzene, which comprises contacting benzene with a tertiary aliphatic mercaptan in the presence of an alkylation catalyst of the Friedel-Crafts type, in a reaction zone under alkylating conditions.

8. The process for alkylating benzene, which comprises contacting benzene with a tertiary aliphatic mercaptan in the presence of an alkylation catalyst comprising aluminum chloride in a reaction zone under alkylating conditions.

9. The process for alkylating benzene, which comprises contacting benzene with a tertiary aliphatic mercaptan in the presence of an alkylation catalyst comprising boron trifluoride in a reaction zone under alkylating conditions.

10. The process for alkylating phenols, which comprises contacting phenol with a tertiary aliphatic mercaptan in the presence of an alkylation catalyst of the Friedel-Crafts type, in a reaction zone under alkylating conditions.

11. The process for alkylating phenols, which comprises contacting phenol with a tertiary aliphatic mercaptan in the presence of an alkylation catalyst comprising aluminum chloride in a reaction zone under alkylating conditions.

12. The process for alkylating phenols, which comprises contacting phenol with a tertiary aliphatic mercaptan in the presence of an alkylation catalyst comprising boron trifluoride in a reaction zone under alkylating conditions.

13. The process which comprises contacting an aromatic hydrocarbon with tertiary butyl mercaptan in the presence of an alkylation catalyst of the Friedel-Crafts type, in a reaction zone under alkylating conditions.

14. The process which comprises contacting an aromatic hydrocarbon with tertiary butyl mercaptan in the presence of an alkylation catalyst comprising aluminum chloride in a reaction zone under alkylating conditions.

15. The process which comprises contacting an aromatic hydrocarbon with tertiary butyl mercaptan in the presence of an alkylation catalyst comprising boron trifluoride in a reaction zone under alkylating conditions.

16. The process for manufacturing tertiary and paratertiary butyl benzene, which comprises contacting benzene with tertiary butyl mercaptan in the presence of an alkylation catalyst of the Friedel-Crafts type, in a reaction zone under alkylating conditions.

17. The process for manufacturing tertiary and paraditertiary butyl benzene, which comprises contacting benzene with tertiary butyl mercaptan in the presence of an alkylation catalyst comprising aluminum chloride in a reaction zone under alkylating conditions.

18. The process for manufacturing tertiary and paraditertiary butyl benzene, which comprises contacting benzene with tertiary butyl mercaptan in the presence of an alkylation catalyst comprising boron trifluoride in a reaction zone under alkylating conditions.

19. The process for manufacturing paratertiary butyl phenol, which comprises contacting phenol with tertiary butyl mercaptan in the presence of an alkylation catalyst of the Friedel-Crafts type, in a reaction zone under alkylating conditions.

20. The process for manufacturing paratertiary butyl phenol, which comprises contacting phenol with tertiary butyl mercaptan in the presence of an alkylation catalyst comprising boron trifluoride-phenol complex in a reaction zone under alkylating conditions.

JACOB R. MEADOW.

Certificate of Correction

Patent No. 2,403,013.   July 2, 1946.

JACOB R. MEADOW

It is hereby certified that errors appear in the printed specification of the above numbered patent requiring correction as follows: Column 6, line 58, for "alcohol" read *phenol*; column 7, line 21, claim 5, for "pressure" read *presence*; and that the said Letters Patent should be read with these corrections therein that the same may conform to the record of the case in the Patent Office.

Signed and sealed this 15th day of October, A. D. 1946.

[SEAL]

LESLIE FRAZER,
*First Assistant Commissioner of Patents.*